United States Patent [19]
Hino et al.

[11] 3,793,085
[45] Feb. 19, 1974

[54] GAS DIFFUSION ELECTRODE FOR CELLS
[75] Inventors: Takashi Hino, Hirakata-shi; Masataro Fukuda, Takatsuki-shi, both of Japan
[73] Assignee: Matsushita Electric Industrial Co., Ltd., Osaka, Japan
[22] Filed: Feb. 16, 1971
[21] Appl. No.: 115,875

Related U.S. Application Data
[63] Continuation of Ser. No. 613,466, Feb. 2, 1967, abandoned.

[30] Foreign Application Priority Data
Feb. 14, 1966 Japan.................................. 41-9489
Feb. 14, 1966 Japan.................................. 41-9490
Feb. 14, 1966 Japan.................................. 41-9491
Apr. 13, 1966 Japan................................ 41-23863
Apr. 13, 1966 Japan................................ 41-23864
Apr. 13, 1966 Japan................................ 41-23865

[52] U.S. Cl........... 136/121, 136/86 D, 136/120 FC
[51] Int. Cl..................... H01m 13/02, H01m 27/04
[58] Field of Search............. 136/120, 86, 142–146, 136/121

[56] References Cited
UNITED STATES PATENTS
3,297,484  1/1967  Niedrach .......................... 136/120
3,305,400  2/1967  Barber .............................. 136/86
3,336,423  8/1967  LeClair .............................. 136/86
3,432,355  3/1969  Niedrach ...................... 136/120 FC
3,276,909  10/1966 Moos ............................ 136/120 FC
3,457,113  7/1969  Deibert ........................ 136/120 FC
3,407,096  10/1968 Landi .................................. 136/86
3,471,338  10/1969 Trachtenberg..................... 136/120
3,134,697  5/1964  Niedrach .............................. 136/86
3,346,421  10/1967 Thompson ......................... 136/120
2,890,261  6/1959  Andre................................. 136/145
2,912,478  11/1959 Justi..................................... 136/86
2,925,456  2/1960  Beusker............................. 136/145
3,222,224  12/1965 Williams............................. 136/120

Primary Examiner—L. Dewayne Rutledge
Assistant Examiner—Peter D. Rosenberg
Attorney, Agent, or Firm—Stevens, Davis, Miller & Mosher

[57] ABSTRACT

A gas diffusion electrode for cells comprising a layer participating in the electrode reaction, said layer consisting essentially of carbon powder and a binder therefor, and a preformed porous fluorocarbon resin film integrally attached to said carbonaceous layer.

11 Claims, 16 Drawing Figures

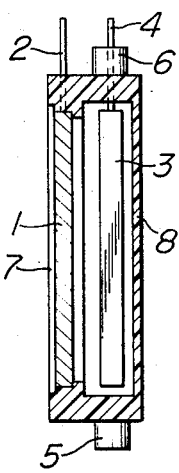
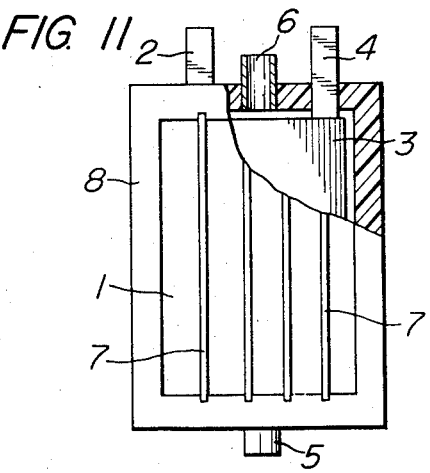
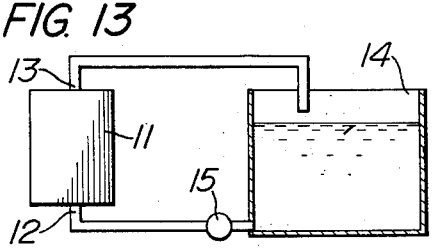
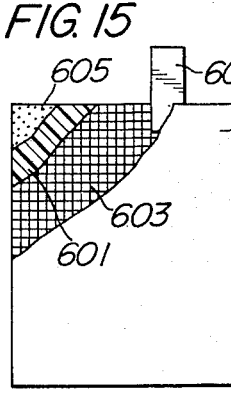
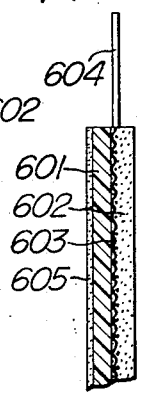
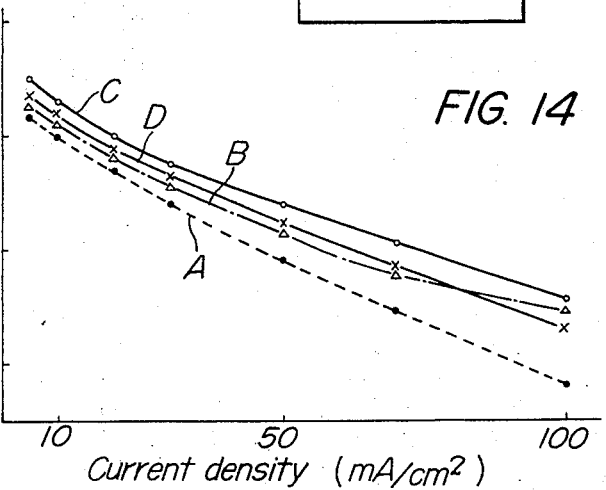

GAS DIFFUSION ELECTRODE FOR CELLS

This application is a continuation of application, Ser. No. 613,466, filed Feb. 2, 1967, now abandoned.

This invention relates to a novel and improved gas diffusion electrode of the kind employed in cells such, for example, as fuel cells and air cells whose active material is a gas.

The output and service life of a cell employing therein a gas diffusion electrode are largely dependent on the performance of the gas diffusion electrode, and various attempts have heretofore been made in an effort to extend the cell service life and improve the output of the cell. Especially, numerous attempts have been directed to the gas diffusion electrode of carbon since the carbon electrode has many excellent features in its cost, catalytic action, electrical conductivity, corrosion resistance and other properties. Various types of carbon electrode have so far been proposed which include a baked electrode made by baking a mixture of powdery carbon and a binder therefor and a non-baked electrode made by molding a mixture of powdery carbon and a synthetic resin binder and heating the molded body at a relatively low temperature for the sake of drying the same. However, the former type of carbon electrode, that is, the baked electrode has been defective in that very complex steps are involved in making the same and yet it is difficult to obtain an electrode of uniform quality. The latter type of carbon electrode, that is, the non-baked electrode has also been defective in that a large degree of polarization develops during discharge at a high current density and it has a low mechanical strength. In addition to the defects as described above, these are more decisive defects which are common to both these baked electrode and non-baked electrode. In the first place, in the prior electrodes, the electrolyte is liable to leak to the gas side and therefore these electrodes have a short service life. Secondly, it is difficult to reduce the thickness of these electrodes in view of their low mechanical strength and poor uniformity and therefore they can only be thinned to a thickness in the order of 4 millimeters at the most.

On the other hand, extensive studies have been made on materials such as a fluorocarbon resin, paraffin and polyethylene for use as a water repellent for the gas diffusion electrode. Upon finding that the fluorocarbon resin is most excellent for use as a water repellent, a gas diffusion electrode of carbon made by compression molding and heat treating powdery carbon including therein a fluorocarbon resin dispersion has been devised, but this electrode has also been defective in its short service life. Recently a film electrode is under study. In this film electrode, a fluorocarbon resin layer is provided on a certain part thereof by applying a fluorocarbon resin dispersion thereto and subjecting the dispersion to heat treatment. For example, a film electrode has been proposed in which a polytetrafluoroethylene dispersion is coated on the gas side face of the electrode and is then subjected to heat treatment at 320°C. for 5 minutes in a nitrogen gas atmosphere to provide the polytetrafluoroethylene film on the gas side face of the electrode. However due to the fact that the polytetrafluoroethylene film shrinks when it is formed by the heat treatment, the film tends to bend or develop cracks therein with a greater size of electrode and is difficult to be deposited in a uniform thickness. A film type of electrode has also been proposed which comprises a stack consisting of successive layers of teflon, teflon-inactive carbon, polyethylene and polyethylene — active carbon deposited from their suspensions on a porous nickel sheet. This film type of electrode has also been defective in that complex steps are involved in making the same.

It is the primary object of the present invention to provide a gas diffusion electrode which is quite free from the defects experienced with the prior electrodes of this kind, which is easy to make, which delivers a large output and which has a long service life. More specifically, the gas diffusion electrode of the present invention is characterized by its integral structure comprised of a layer which is made from powdery carbon and a binder therefor and participates in the electrode reaction and a pre-formed fluorocarbon resin film of porous nature.

In a gas diffusion electrode, generally, the polarization becomes extensive and the electrode service life expires when the electrolyte permeates into the electrode as a result of discharge until finally the gas side of the electrode is covered by the leaked electrolyte. According to the electrode of the present invention, the electrolyte permeating into the electrode can not reach the gas supply side by being intercepted by the porous fluorocarbon resin film and the discharge can thus be unobstructedly continued. Therefore the problem of leakage of the electrolyte can also be obviated. The present invention is further advantageous in that the overall thickness of the electrode can be made small since the layer whose principal composition is powdery carbon need not be thickened to resist the leakage of electrolyte therethrough. Another advantage derivable from the invention is the fact that a cell employing the electrode can develop a large output because the porous fluorocarbon resin film on the electrode does not obstruct the diffusion of a gaseous active material. The present invention is further advantageous in that the electrode can be made by an extremely simple process compared with the processes involved in the manufacture of the prior electrodes as described previously. More precisely, the gas diffusion electrode of the invention can be manufactured by coating a mixture of carbon powder and a solution of a synthetic resin binder on a pre-formed porous fluorocarbon resin film and heating it to remove the solvent, or by placing a mixture of carbon powder and a solution of a synthetic resin binder on a pre-formed porous fluorocarbon resin film, compression molding these layers to a desired structure and heating the structure to remove the solvent, or by placing a mixture of carbon powder and powder of a synthetic resin having a binding property, preferably, powder of a fluorocarbon resin on a pre-formed porous fluorocarbon resin film and compression molding these layers to a desired shape. In the methods of making the electrode as described above, where there is a need to add a catalyzer therein, such catalyzer may be added according to any method known in the prior art. For example, a quantity of carbon powder may be immersed in a chloroplatinic acid solution and then dried and subjected to a heating treatment to have a catalyzer contained therein. Where the water repelling ability of a resin employed in the electrode is insufficient to give the desired water repelling ability to the electrode, carbon powder preliminarily subjected to a waterproofing treatment by paraffin or a fluorocarbon resin may be used or a water repellent may be preliminarily added to a synthetic resin binder solution.

FIGS. 11 and 12 are a sectional view and a partly cutaway front elevational view, respectively, of an air-methanol fuel cell employing therein the electrode according to the present invention.

FIG. 13 is a diagrammatic view of a discharge arrangement for the fuel cell shown in FIGS. 11 and 12.

FIG. 14 is a graphic illustration of the results of discharge with the arrangement shown in FIG. 13.

FIGS. 15 and 16 are a sectional view and a partly cutaway front elevational view, respectively, of another form of the electrode according to the present invention.

Preferred embodiments of the invention will be described in detail hereunder.

EMBODIMENT I

Figure 1:
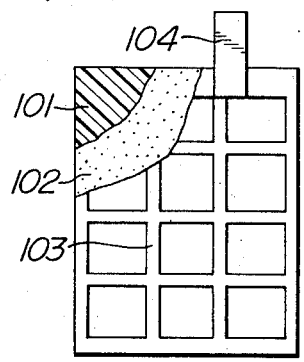
FIGS. 1 and 2 are sectional view and a partly cutaway front elevational view, respectively, of one form of the electrode according to the present invention.
Figure 2:
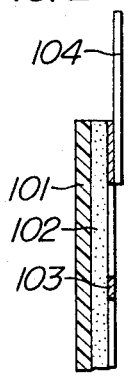

Referring first to FIGS. 1 and 2, there is shown one form of the electrode of the invention which comprises a pre-formed porous fluorocarbon resin film 101, a layer 102 consisting of carbon powder and polystyrene, a current collector 103 of silver bonded to the carbon layer 102 by a binder, and a terminal 104. A product of Daikin Kogyo Co., Ltd. sold under the trade name of "Polyflon Paper" was used as the porous fluorocarbon resin film 101, which was made by dispersing short fibers of polytetrafluoroethylene resin into a liquid, forming the short fibers into a sheet about 0.5 mm thick, and then heating to dry the same. This polyflon paper was 0.5 mm thick and had a porosity of 70 percent, a mean air permeability of 70 cc/sec. cm². 100 mm $H_2O$ and a mean pore diameter of 2 $\mu$.

A coating composition consisting of 100 parts by wieght of activated carbon powder and 50 parts by weight of a 10 percent polystyrene — benzene solution was coated on the polyflon paper 101 and was dried at 50°C. under vacuum for 10 hours to obtain the carbon layer 102 on the polyflon paper 101. On the surface of this carbon layer 102, a conductive silver coating material was coated in a mesh-like shape at spacings of 5 mm to provide the current collector 103, and a nickel strip was attached to a peripheral portion of the current collector 103 to provide the terminal 104. The entire structure was then dried at room temperature to obtain the electrode.

EMBODIMENT II

This embodiment is generally similar to Embodiment I except that the layer 102 consisting of carbon powder and polystyrene was prepared from a mixture consisting of 100 parts by weight of activated carbon powder and 80 parts by weight of a 7 percent polystyrene — benzene solution. The electrode so obtained had an overall thickness of 1 mm and will hereinafter be referred to as electrode (a).

EMBODIMENT III

A polyflon paper similar to that employed in Embodiment I was used, and a mixture consisting of 100 parts by weight of activated carbon powder and 50 parts by weight of a 14.5 percent polystyrene - benzene solution was placed on the polyflon paper. After compression molding the mixture on the polyflon paper, the molded stack was dried to removed benzene. The finished structure of this electrode is substantially similar to that of Embodiment I.

EMBODIMENT IV

Figure 3:
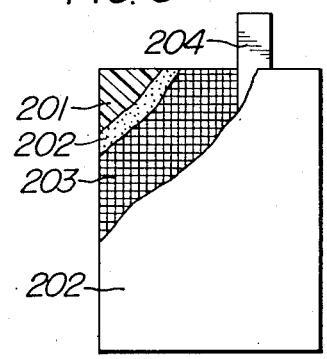
FIGS. 3 and 4 are sectional view and a partly cutaway front elevational view, respectively, of another form of the electrode according to the present invention.
Figure 4:
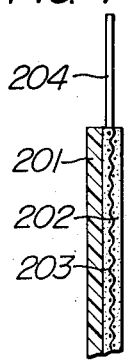

An electrode of the present embodiment is shown in FIGS. 3 and 4. The electrode comprises a pre-formed porous fluoroethylene resin film 201, a layer 202 consisting of carbon powder subjected to a water repelling treatment by paraffin and polystyrene, a current collector 203 in the form of a nickel net, and a terminal 204. The polyflon paper 201 used herein was generally similar to that employed in Embodiment I and was 1 mm thick and had a porosity of 65 percent, a mean air permeability of 15 cc/sec. cm². 100 mm $H_2O$ and a mean pore diameter of 2 $\mu$. On this polyflon paper 201, a mixture consisting of 100 parts by weight of activated carbon powder having 3 percent by weight paraffin added thereto by a known method and 40 parts by weight of a 10 percent polystyrene — benzene solution was placed in an amount of 0.1 gram per square centimeter, and a nickel net 203 made by weaving nickel wires 0.2 mm in diameter into a net of 20 mesh was embedded in the middle of the mixture layer 202. A pressure of 200 kilograms per square centimeter was applied to the mixture layer 202 to compression mold the layer on the polyflon paper 201. The molded stack was then dried at 50°C. under vacuum to obtain the electrode, which will be hereinafter referred to as electrode (b).

EMBODIMENT V

A polyflon paper smilar to that employed in Embodiment I was first placed in a compression molding metal mold. Then a mixture consisting of 80 parts by weight of activated carbon powder and 20 parts by weight of a fluorinated ethylene-propylene fluorocarbon resin in powdery form (a copolymer of tetrafluoroethylene and hexafluoropropylene sold under the trade name of "Neoflon" by Daikin Kogyo Co., Ltd.) with a 20-mesh nickel net embedded therein was placed on the polyflon paper, and while gradually compressing, a pressure of 200 kilograms per square centimeter was applied thereto for 5 minutes to mold the mixture with the polyflon paper under compression. The molded stack was then subjected to heating at 295°C. for 20 minutes in a nitrogen gas atmosphere and a nickel terminal is attached thereto with a conductive binder. The finished structure of the electrode is substantially similar to that of Embodiment IV.

EMBODIMENT VI

Figure 5:
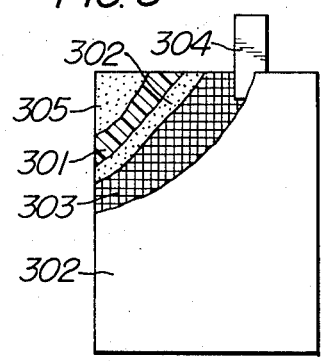
FIGS. 5 and 6 are a sectional view and a partly cutaway front elevational view, respectively, of still another form of the electrode according to the present invention.
Figure 6:
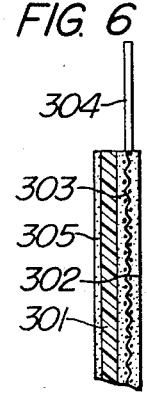

An electrode of the present embodiment is shown in FIGS. 5 and 6 and comprises a layer 305 consisting of powder of a fluorinated ethylene-propylene fluorocarbon resin, that is, "Neoflon," a polyflon paper 301 similar to that employed in Embodiment IV, a layer 302 consisting of a mixture of activated carbon powder and fluorinated ethylene-propylene fluorocarbon resin powder, that is "Neoflon," a current collector 303 in the form of a nickel net, and a terminal 304. In making the electrode as shown, powder of fluorinated ethylene-propylene fluorocarbon resin that is, "Neoflon," 305 was first placed in a metal mold so that the resin was distributed in an amount of 8 milligrams per square centimeter of the mold area and then a polyflon paper 301 was placed on the resin layer 305. A mixture of 85 parts by weight of activated carbon powder and 15 parts by weight of fluorinated ethylene-propylene fluorocarbon resin powder, that is "Neoflon" was placed on the polyflon paper 301 and a 20-mesh nickel net 303 was embedded in the middle of the carbon layer 302. A pressure of 200 kilograms per square centimeter was then applied to the stack of these layers to obtain a compression molded electrode. This electrode will hereinafter be referred to as electrode (c).

EMBODIMENT VII

Figure 8:
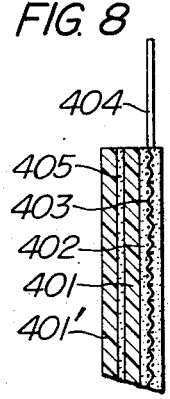
FIGS. 7 and 8 are a sectional view and a partly cutaway front elevational view, respectively, of a further form of the electrode according to the present invention.
Figure 7:
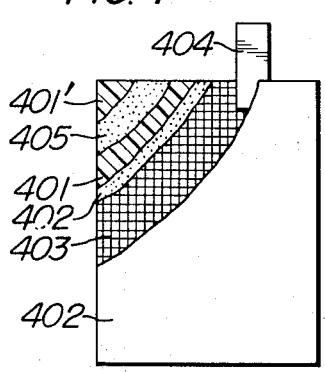

In FIGS. 7 and 8, there is shown an electrode according to the present embodiment, which comprises a polyflon paper 401′, a layer 405 of fluorinated ethylene-propylene fluorocarbon resin powder, that is, "Neoflon," a polyflon paper 401, a carbonaceous layer 402, a current collector 403 of nickel, and a terminal 404. It will be seen that the electrode of the present embodiment differs from the electrode of Embodiment VI in that an additional polyflon paper 401′ is provided through a fluorinated ethylene-propylene fluorocarbon resin layer on the gas side of the latter electrode. In making the electrode as shown, a polyflon paper 401′ was first placed in a metal mold. On this polyflon paper 401′, a layer 405 of fluorinated ethylene-propylene fluorocarbon resin powder in an amount of 8 milligrams per square centimeter, a polyflon paper 401, and a layer 402 of a mixture consisting of 85 parts by weight of activated carbon powder and 15 parts by weight of fluorinated ethylene-propylene fluorocarbon resin powder that is, "Neoflon" with a 20-mesh nickel net 403 embedded in the middle thereof were successively stacked, and a pressure of 200 kilograms per square centimeter was applied to the stack to obtain a compression molded electrode. This electrode will be hereinafter referred to as electrode (d).

EMBODIMENT VIII

Figure 9:
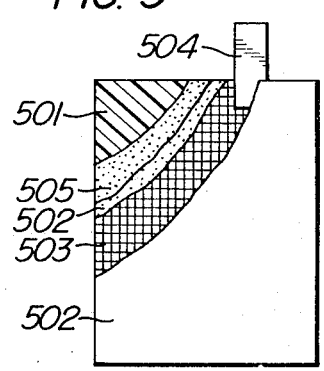
FIGS. 9 and 10 are a sectional view and a partly cutaway front elevational view, respectively, of a still further form of the electrode according to the present invention.
Figure 10:
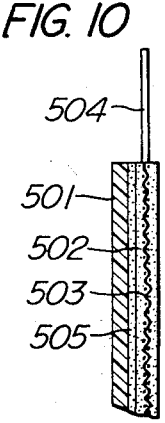

In FIGS. 9 and 10 there is shown an electrode according to the present embodiment, which comprises a polyflon paper 501, a layer 505 of fluorinated ethylene-propylene fluorocarbon resin powder, a layer 502 consisting of carbon powder and fluorinated ethylene-propylene fluorocarbon resin powder, a current collector 503 in the form of a nickel net, and a terminal 504. In making the electrode as shown, a polyflon paper 501 0.7 mm thick having a porosity of 65 percent, a mean air permeability of 15 cc/sec. cm². 100 mm H$_2$O and a mean pore diameter of 2 $\mu$, a layer 505 of fluoroethylene-propylene resin powder in an amount of 8 milligrams per square centimeter, and a layer 502 of a mixture consisting of 85 parts by weight of activated carbon powder and 15 parts by weight of fluorinated ethylene-propylene fluorocarbon resin powder with a 20-mesh nickel net embedded in the middle thereof were successively stacked in a metal mold, and a pressure of 200 kilograms per square centimeter was applied to the stack to obtain a compression molded electrode.

EMBODIMENT IX

A layer of a mixture consisting of 85 parts by weight of activated carbon powder and 15 parts by weight of fluorinated ethylene-propylene fluorocarbon resin powder, a polyflon paper similar to that employed in Embodiment I, a layer of the mixture of the kind described above, a nickel net and a layer of the mixture of the kind described above were successively stacked in a metal mold, and a pressure of 50 kilograms per square centimeter was applied to the stack to obtain a compression molded electrode. This electrode is substantially similar to that of FIG. 6 except that the resin powder layer 305 in the latter electrode is replaced by a layer of a mixture of carbon powder and resin powder.

EMBODIMENT X

In FIGS. 15 and 16, there is shown an electrode according to the present embodiment, which comprises a polyflon paper 601, a layer 605 of a fluorinated ethylene-propylene fluorocarbon resin in powdery form (a copolymer of tetrafluoroethylene and hexafluoropropylene, that is "Neoflon"), a layer 602 of a mixture consisting of carbon powder and powder of a fluorinated ethylene-propylene fluorocarbon resin (a copolymer of tetrafluoroethylene and hexafluoropropylene, that is, "Neoflon," and a current collector 603 in the form of a 20-mesh nickel net. The nickel net 603 is integrally bonded to the polyflon paper 601 prior to the manufacture of the electrode. In making the electrode as shown, a polyflon paper 601 having powder of a tetrafluoroethylene-hexafluoropropylene copolymer deposited on one face thereof in an amount of 10 milligrams per square centimeter was first placed in a metal mold. A mixture of 85 parts by weight of activated carbon powder and 15 parts by weight of tetrafluoroethylene — hexafluoropropylene copolymer powder was then placed on the polyflon paper 601, and a pressure of 200 kilograms per square centimeter was applied to the stack of these layers to obtain a compression molded electrode.

In FIGS. 11 and 12, there is shown an air-methanol fuel cell in which the electrode (c) made by the method described in Embodiment VI is employed as its air electrode. The fuel cell includes an air electrode 1 of the invention made by the method described in Embodiment VI, a terminal 2 of the electrode 1, a fuel electrode 3 made by adding a noble metal catalyzer to a porous nickel plaque, a terminal 4 of the electrode 3, an inlet 5 and an outlet 6 of a fuel and an electrolyte, a plurality of electrode backing or reinforcing members 7, and a cell casing 8.

In the fuel cell, the electrode reinforcing members 7 are employed for the following reasons: It will be recalled that the electrode according to the present invention is a block of thin thickness having a reaction-participating carbonaceous layer integrally attached onto a pliable, porous, fluorocarbon resin film, and thus the electrode itself is also pliable. When therefore a fuel cell is made by use of an electrode of large size, the electrode may bulge outwardly by the pressure of the fuel and electrolyte. Consequently, in case a plurality of such cells are stacked up, the electrode in one cell may contact the adjacent electrode or narrow the gas space to thereby obstruct satisfactory diffusion of the gaseous active material toward the electrode. The electrode reinforcing members 7 are provided to prevent such detrimental phenomena from taking place and at the same time to prevent separation of the reaction-participating carbonaceous layer from the porous fluorocarbon resin film.

The electrode-reinforcing members 7 may preferably be bars of resinous or metallic material which may be parallelly disposed or formed into a grating and are bonded or forced onto the gas side face of the electrode structure. The provision of such reinforcing members results in a decrease of the reaction surface of the electrode by an extent of the area occupied by the members bonded or forced thereonto, but this decrease in the reaction surface can be made to a minimum by selecting reinforcing members of such material which has a sufficient mechanical strength to prevent warping of the electrode in spite of a small size and a small contacting face. The material suitable for this purpose is a hard resin or metal which can endure an extended time of use and is not corroded by the electrolyte even if there might be leakage of the electrolyte. In this respect, a metal bar is considered most suitable in view of its high hardness and long durable service life, and it is most preferred that such metal bars are preliminarily coated with a resinous coating material such as polyvinyl chloride or polyethylene to give a resistance to corrosion by the electrolyte.

In this experiment, piano wires were immersed in a benzene solution of polyethylene, then dried and heat treated at 130°C. to provide a polyethylene coating thereon. A plurality of such reinforcing members were bonded to the gas side face of the electrode by a resin binder. Then the composite structure comprising the electrode and the reinforcing members was embedded in the cell casing and fixed in place.

FIG. 13 shows an arrangement used for the discharge of the fuel cell described above. In FIG. 13 the fuel cell is generally designated by numeral 11 to which the fuel and electrolyte are supplied from a reservoir 14 by a supply pump 15 through an inlet 12 and discharged therefrom through an outlet 13. This air-methanol fuel cell employs atmospheric oxygen as its gaseous electrode active material and the active material is supplied to the electrode by natural diffusion of atmospheric air. A 2 : 8 mixture of methanol and a 30 percent potassium hydroxide solution is employed as the fuel and electrolyte and is circulated by the pump 15 from the fuel-electrolyte reservoir 14 to the cell 11 in an amount about ten times the amount required for the proper discharge.

The results of discharge with the arrangement as described above are graphically shown in FIG. 14 in which current density is plotted against potential of the air electrode with respect to a mercuric oxide electrode. In FIG. 14, curves A, B, C and D represent the discharge characteristics of the cell when the electrodes (a), (b), (c) and (d) are incorporated in the cell, respectively. It will be seen that all these cells can make a high current density discharge in the order of 50 milliamperes per square centimeter in cooperation with an active material which is air. These cells exhibited excellent performances that the potential did not decrease even after 9,600 hours of discharge at a current density of 30 milliamperes per square centimeter in case of the cell having therein the electrode (a) and at a current density of 50 milliamperes per square centimeter in case of the cells having therein the electrodes (b), (c) and (d), and no leakage of the electrode to the air side was observed in any of the cells.

From the foregoing description it will be appreciated that the electrode according to the invention can make a high current density discharge for an extended time, and can be made by a simple process, while its thin thickness is advantageous to provide a cell of small size.

We claim:

1. A gas diffusion electrode for cells comprising a layer (102) participating in the electrode reaction, said layer consisting essentially of carbon powder and a binder therefor, said binder consisting of a powder of a copolymer of tetrafluoroethylene and hexafluoropropylene, and a pre-formed porous fluorocarbon resin paper-like layer (101) consisting of fibers of polytetrafluoroethylene integrally attached to the gas supply side of said layer (102).

2. A gas diffusion electrode according to claim 1 in which said carbon powder contains therein a metal catalyzer.

3. A gas diffusion electrode according to claim 1 in which said carbon powder is activated carbon powder subjected to a waterproofing treatment.

4. A gas diffusion electrode according to claim 1 in which a plurality of reinforcing members (7) are provided on the gas side face of said electrode.

5. A gas diffusion electrode for cells comprising a layer (202) participating in the electrode reaction, said layer consisting essentially of carbon powder and a binder therefor, said binder consisting of a powder of a copolymer of tetrafluoroethylene and hexafluoropropylene, and a pre-formed porous fluorocarbon resin paper-like layer (201) consisting of fibers of polytetrafluoroethylene integrally attached to the gas supply side of said layer (202), said layer (202) having a current collector (203) embedded therein.

6. A gas diffusion electrode for cells comprising a layer (302) participating in the electrode reaction, said layer consisting essentially of carbon powder and a binder therefor said binder consisting of a powder of a copolymer of tetrafluoroethylene and hexafluoropropylene, a pre-formed porous fluorocarbon resin paper-like layer (301) consisting of fibers of polytetrafluoroethylene disposed on the gas supply side of said layer (302), and a powdery synthetic resin layer (305) of a water repelling and binding nature consisting of a copolymer of tetrafluoroethylene and hexafluoropropylene disposed on the other side of said fluorocarbon resin film (301).

7. A gas diffusion electrode for cells comprising a first pre-formed porous fluorocarbon resin paper-like layer (401) consisting of fibers of polytetrafluoroethylene, a layer (402) disposed on one side of said first fluorocarbon resin paper-like layer (401) and participating in the electrode reaction, said layer (402) consisting essentially of carbon powder and a binder therefor, said binder consisting of a powder of a copolymer of tetrafluoroethylene and hexafluoropropylene, a powdery synthetic resin layer (405) of a water repelling and binding nature consisting of a copolymer of tetrafluoroethylene and hexafluoropropylene disposed on the other side of said first fluorocarbon resin paper-like layer, and a second pre-formed porous fluorocarbon resin paper-like layer (401') consisting of fibers of polytetrafluoroethylene disposed on the other side of said powdery synthetic layer (405).

8. A gas diffusion electrode for cells comprising a pre-formed porous fluorocarbon resin paper-like layer (501) consisting of fibers of polytetrafluoroethylene, a powdery synthetic resin layer (505) of water repelling and binding nature consisting of a copolymer of tetrafluoroethylene and hexafluoropropylene disposed on one side of said fluorocarbon resin paper-like layer (501), and a layer (502) disposed on the other side of said powdery synthetic resin layer (505) and participating in the electrode reaction, said layer (502) consisting essentially of carbon powder and a binder therefor, said binder consisting of a powder of a copolymer of tetrafluoroethylene and hexafluoropropylene.

9. A gas diffusion electrode for cells comprising a pre-formed porous fluorocarbon resin paper-like layer (601) consisting of fibers of polytetrafluoroethylene, a current collector (603) integrally bonded to said film (601) on one side thereof, a layer (602) consisting essentially of carbon powder and a binder therefor, said binder consisting of a powder of a copolymer of tetrafluoroethylene and hexafluoropropylene disposed on the collector side of said fluorocarbon resin paper-like layer (601), and a powdery synthetic resin layer (605) of a water repelling and binding nature consisting of a copolymer of tetrafluoroethylene and hexafluoropropylene disposed on the other side of said fluorocarbon resin paper-like layer (601).

10. A gas diffusion electrode for cells comprising a layer participating in the electrode reaction, said layer consisting essentially of carbon powder and binder therefor, said binder consisting of a powder of a copolymer of tetrafluoroethylene and hexafluoropropylene, and a porous fluorocarbon resin paper-like layer consisting of fibers of polytetrafluoroethylene embedded in said layer participating in the electrode reaction.

11. A method for making a gas diffusion electrode as described in claim 2, characterized by coating a mixture of carbon powder and a solution of said copolymer binder on one face of said pre-formed porous fluorocarbon resin film paper-like oayer to obtain an integrally bonded electrode structure.

* * * * *